US010200410B2

(12) United States Patent
Bursell et al.

(10) Patent No.: US 10,200,410 B2
(45) Date of Patent: Feb. 5, 2019

(54) NETWORKED PEER DEVICE ROUND-ROBIN SECURITY CONTROLLER

(71) Applicant: INTEL CORPORATION, Santa Clara, CA (US)

(72) Inventors: Michael Hingston McLaughlin Bursell, Halstead (GB); Stephen T. Palermo, Chandler, AZ (US); Chris MacNamara, Limerick (IE); Pierre Laurent, Limerick (IE); John J. Browne, Limerick (IE)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 15/282,564

(22) Filed: Sep. 30, 2016

(65) Prior Publication Data

US 2018/0097843 A1 Apr. 5, 2018

(51) Int. Cl.
*H04L 29/06* (2006.01)

(52) U.S. Cl.
CPC .......... *H04L 63/20* (2013.01); *H04L 63/0876* (2013.01); *H04L 63/1433* (2013.01)

(58) Field of Classification Search
CPC . H04L 63/20; H04L 63/0876; H04L 63/1433; H04L 41/0668
USPC ........................................................... 726/1
See application file for complete search history.

(56) References Cited

U.S. PATENT DOCUMENTS

| 2002/0107934 | A1* | 8/2002 | Lowery | G06F 17/3087 |
| | | | | 709/213 |
| 2013/0117402 | A1* | 5/2013 | Jo | H04W 16/14 |
| | | | | 709/208 |
| 2016/0381079 | A1* | 12/2016 | Ben-Shalom | H04L 63/105 |
| | | | | 726/29 |
| 2017/0289152 | A1 | 10/2017 | Bursell et al. | |

OTHER PUBLICATIONS

Unpublished U.S. Appl. No. 15/089,038, filed Apr. 1, 2016.

* cited by examiner

*Primary Examiner* — Yogesh Paliwal
(74) *Attorney, Agent, or Firm* — Grossman, Tucker, Perreault & Pfleger, PLLC

(57) ABSTRACT

A round-robin network security system implemented by a number of peer devices included in a plurality of networked peer devices. The round-robin security system permits the rotation of the system security controller among at least a portion of the peer devices. Each of the peer devices uses a defined trust assessment ruleset to determine whether the system security controller is trusted/trustworthy. An untrusted system security controller peer device is replaced by another of the peer devices selected by the peer devices. The current system security controller peer device transfers system threat information and security risk information collected from the peer devices to the new system security controller elected by the peer devices.

22 Claims, 6 Drawing Sheets

NETWORKED PEER DEVICE ROUND-ROBIN SECURITY CONTROLLER

TECHNICAL FIELD

The present disclosure relates to peer network security systems and methods.

BACKGROUND

The increasing number of connected devices increases the opportunity for unauthorized or inappropriate access to networks and/or the devices communicably coupled across the network. Such networks may be as simple as a collection of Internet of Things (IoT) devices in a home, or as complex as a servers used in public or private networks that span cities, countries, or even continents. In such networks, each of the various peers may have a trusted relationship with some or all of the other peers and thus, no single peer or other entity within the network may be capable of providing network system security that includes trusted monitoring and threat information for both the peer devices included in the network and the network itself.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
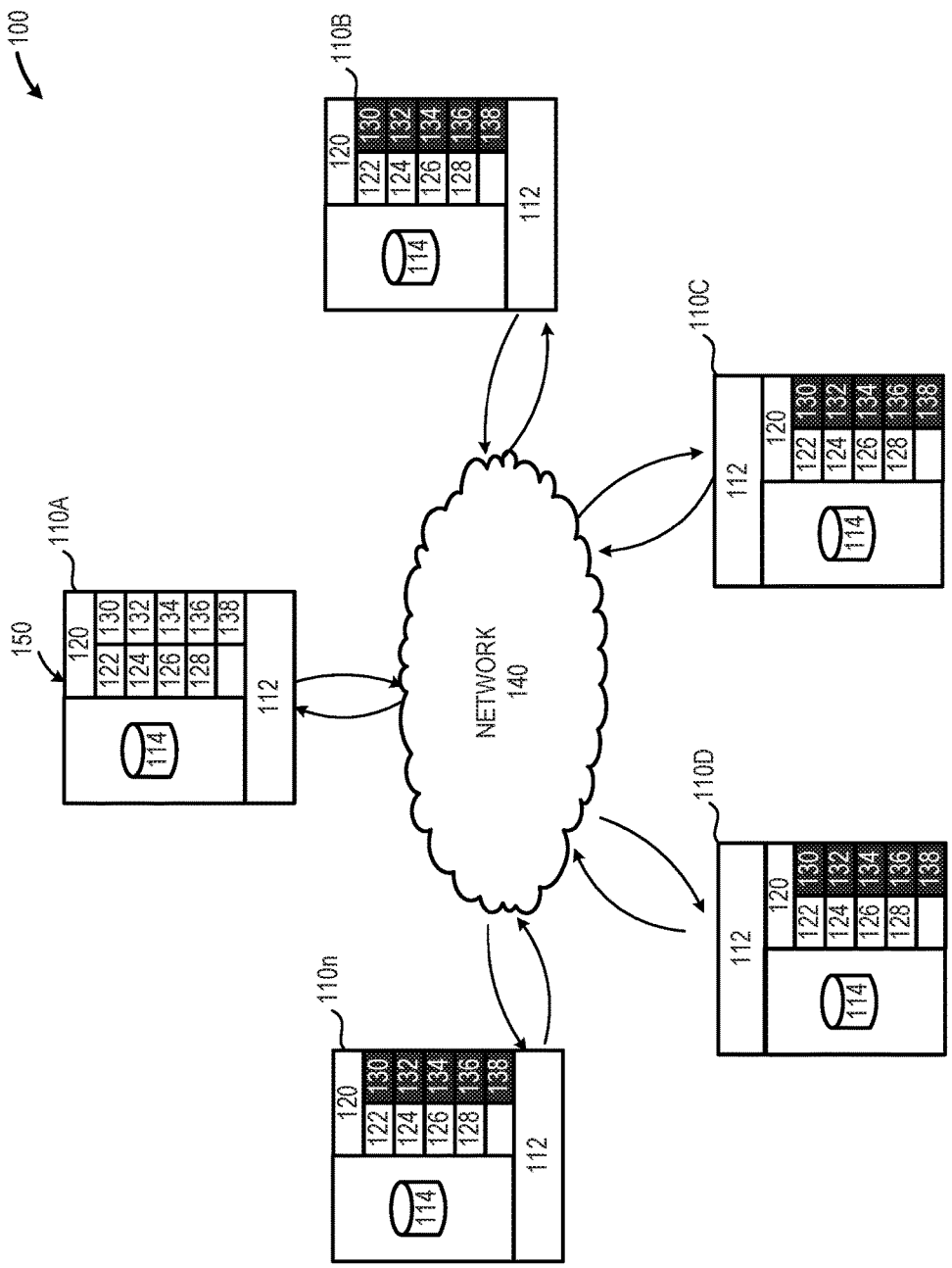
FIG. 1 is a schematic diagram of an illustrative system including a number of networked peer devices communicably coupled via one or more networks and in which one of the peer devices functions as a primary device security controller for all of the peer devices, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Many scenarios exist where multiple peers are loosely connected and lack a centralized and/or fully trusted controlled, but where a need exists for access to security monitoring and threat detection across the network. In some implementations, each peer may independently collect security and/or threat information, either by itself or in conjunction with other connected nodes. Each peer may then independently perform a security assessment based on the collected security and threat information. Such an arrangement may lead to different peers evaluating a threat differently and may cause some or all of the peers to miss security or threats that compromise a plurality of the peers in the network. Thus, pooling or sharing of information between peers may have greater utility even in instances where the trust relationship between the peers is weak and when the probity of certain peers within the network may be in question.

As used herein, the term "peer" and the collective term "peers" may refer to a variety of different networked, processor-based, entities. Some or all of the networked entities include single hosts or systems, and others of the entities may include multiple components or machines. However, within the peer network, no single one of the peers is a trusted entity with which all of the other peers form a trusted relationship and upon which all of the other peers rely upon for the provision of security and/or threat information. Non-limiting examples of peers include: semi-autonomous or autonomous drones, mobile phones, IoT device, applications such as Network Function Virtualizations (NFVs) or Virtual Machines (VMs) in a Mobile Edge Cloud (MEC) deployment, or multiple tenants hosted by the same cloud service provider (CSP).

The systems and methods described herein feature multi-peer security monitoring and threat detection. In such systems a single network connected peer device is nominated as a primary device with responsibility for providing the security controller for all network connected peer devices. Upon election, the primary device collects security and threat information from all network connected peer devices. The primary device applies defined threat and/or security assessment rules to beneficially identify threats and/or security risks to the entire network of peer devices. The primary device is also able to initiate proactive measures to mitigate the impact of such security threats to the network as a whole.

Advantageously, the systems and methods disclosed herein rotate, in a round-robin manner, the responsibilities of the primary security controller from one network connected peer to another network connected peer when a malicious or suspicious activity taken by the peer device providing the current primary security controller is detected by at least one of the other network connected peer devices. Each of the network connected peers is provided a number of define trust assessment rulesets that are used to evaluate or otherwise assess the trustworthiness of the current primary device security controller. Upon detecting evidence of untrustworthiness in the current primary device security controller, the security controller responsibilities are transferred to another of the network connected peers that, in turn, assumes the mantel of a primary device security controller for the network connected peers.

Such a distribution of security controller responsibilities beneficially reduces the security risk to the network by rotating responsibilities to a new primary peer device within the network at the first sign of suspicious or untrustworthy behavior by the peer device currently providing the security controller. In other words, there is no single peer device in whom the entire trust solution remains, the systems and methods described herein are able to operate over separate trust domains. Such an arrangement is particularly advantageous in virtualized deployments and schemes in which computing resources are provisioned when needed such as within NFV environments. NFV implementations rely upon the ability to use software for functions typically performed by hardware, such as Network Service Chains. In such implementations, the threat of a single point of failure is beneficially reduced or even eliminated since any network connected peer device is able to function as a security controller for all of the peers in the network.

A round-robin peer device network security system is provided. The system may include a plurality of networked processor-based peer devices, each of the peer devices including: at least one data storage device to store data representative of: at least one defined trust assessment ruleset; and at least one defined system security controller (SSC) peer device election ruleset. The system may additionally include at least one communication interface to communicate information to an SSC peer device elected from the network of peer devices. The system may additionally include at least one processor communicably coupled to the data storage device and to the at least one communications interface, the processor including: monitoring circuitry to collect information from at least one of the peer devices included in the plurality of networked peer devices; trust assessment circuitry to apply the at least one trust assessment ruleset to the information collected from the at least one peer device to determine a value indicative of a level of trust placed in the at least one peer device; and election circuitry to apply the at least one SSC peer device election ruleset to select at least one of the other peer devices included in the plurality of networked peer devices as a new SSC peer device to replace a current SSC peer device.

A peer device network system security method is provided. The method may include, for each of at least some of a plurality of networked peer devices, selectively collecting, via monitoring circuitry, information indicative of a level of trust in a peer device in the plurality of networked peer devices, the peer device providing a current system security controller (SSC) peer device; applying, via trust assessment circuitry, at least one defined trust assessment ruleset to the information collected from the current SSC peer device; determining, by a processor communicably coupled to the monitoring circuitry and the trust assessment circuitry, a value indicative of a level of trust placed in the current SSC peer device; selecting, via election circuitry, at least one of the other peer devices included in the plurality of networked peer devices as a new SSC peer device using at least one SSC peer device election ruleset, the selection of the new SSC peer device responsive to the determined value indicative of the level of trust placed in the current SSC peer device meeting at least one defined threshold value.

A system security controller (SSC) peer device for a plurality of networked peer devices is provided. The system may include at least one data storage device to store data representative of at least one defined threat assessment ruleset; at least one communication interface to receive information from at one of the peer devices in the plurality of networked peer devices; at least one processor communicably coupled to the memory and to the at least one communications interface, the processor including: compilation circuitry to compile information received from the at least one peer device included in the plurality of networked peer devices, the information including at least one of: threat assessment information or security risk information; threat assessment circuitry to determine, based on the at least one defined threat assessment ruleset, a respective value indicative of at least one of: a threat assessment or a security risk to at least one peer device in the plurality of networked peer devices; and rollover circuitry to communicate at least a portion of the compiled information to a new SSC peer device responsive to an election of the new SSC peer device by at least one of the peer devices included in the plurality of networked peer devices.

A network security system is provided. The system may include, for each peer device in a plurality of networked peer devices: a means for selectively collecting information indicative of a level of trust in a peer device in the plurality of networked peer devices, the peer device providing a current system security controller (SSC) peer device; a means for applying at least one defined trust assessment ruleset to the information collected from the current SSC peer device; a means for determining a value indicative of a level of trust placed in the current SSC peer device; and a means for selecting at least one of the other peer devices included in the plurality of networked peer devices as a new SSC peer device using at least one SSC peer device election ruleset, the selection of the new SSC peer device responsive to the determined value indicative of the level of trust placed in the current SSC peer device meeting at least one defined threshold value.

A non-transitory machine readable storage device is provided. The non-transitory machine readable storage device includes machine-readable instructions that when executed by a processor, cause the processor to provide a network security system controller, that performs the following: selectively collects, via monitoring circuitry, information indicative of a level of trust in a peer device in the plurality of networked peer devices, the peer device providing a current system security controller (SSC) peer device; applies, via trust assessment circuitry, at least one defined trust assessment ruleset to the information collected from the current SSC peer device; determines, by a processor communicably coupled to the monitoring circuitry and the trust assessment circuitry, a value indicative of a level of trust placed in the current SSC peer device; and selects, via election circuitry, at least one of the other peer devices included in the plurality of networked peer devices as a new SSC peer device using at least one SSC peer device election ruleset, the selection of the new SSC peer device responsive to the determined value indicative of the level of trust placed in the current SSC peer device meeting at least one defined threshold value.

As used herein, the term "operably couple" and devices or components that are referred to as being "operably coupled" refers to devices or components that are coupled in such a manner that enables full functionality and operation of the designated system. As such, an operable coupling is dependent on the type and nature of the devices and/or components referred to as "operably coupled." For example, in a mechanical system, two members referred to as "operably coupled" may be mechanically (e.g., moveably or immovably) joined, coupled or affixed together in a manner that makes possible the defined purpose or use of the members. In another example, electrical components that are referred to as operably coupled may be directly or indirectly joined using conductive elements or similar electrically conductive components, electrical components, semiconductor devices, and similar such that continuous, intermittent, or periodic current flow between the devices is possible. Such electrical devices may or may not be physically joined to a common substrate, device, or system. In another example, two digital devices referred to as operably coupled may be directly or indirectly joined using elements (e.g., electrical conductors, optical fibers, or similar) or may be wirelessly communicably coupled in a manner supporting unidirectional or bidirectional communication and/or data flow between the devices. Thus, "operably coupled" is intended to be interpreted in the broadest sense to include mechanical, physical, electrical, and/or digital coupling between devices and/or systems in such a manner that full functionality of the device or system as a whole is provided.

FIG. 1 provides a schematic diagram of an illustrative system 100 including a number of networked peer devices 110A-110n (collectively, "peer devices 110") communicably coupled via one or more networks 140 and in which all of the peer devices 110 are provisioned to provide a system security controller 150, and one or more of the peer devices 110A provides the system security controller 150 for all of the peer devices 110, in accordance with at least one embodiment described herein. Each of the peer devices 110 includes at least one communications interface 112, at least one storage device 114, and at least one processor 120.

The at least one storage device 114 stores or otherwise retains at least one defined trust assessment ruleset used by the peer device 110 to evaluate the trustworthiness and/or security of the peer device 110A providing the current system security controller $150_{CURRENT}$. The at least one storage device 114 also stores or otherwise retains at least one system security controller election ruleset used by at least a portion of the peer devices 110 included in the system 100 to select at least one peer device 110 as a new system security controller $150_{NEW}$. Thus, the peer devices 110 form a network in which responsibility for threat assessment and security risk detection is placed upon at least one peer device 110A elected, selected, or otherwise nominated by the peer devices 110 to fulfill the role of system security controller 150 for the system 100.

The peer devices 110 continuously, periodically, or intermittently monitor the peer device 110A providing the system security controller 150 using one or more defined trust assessment rulesets. Upon detecting by one or more of the peer devices 110 suspicious activity involving the peer device 110A providing the system security controller 150, some or all of the peer devices 110 included in the system 100 may select, elect, or nominate a new peer device 110A to fulfill the role of new system security controller $150_{NEW}$ that replaces the peer device 110A previously fulfilling the role of system security controller $150_{OLD}$.

Although described in the context of a single primary entity 110A, the peer device network 100 may include any number of peer device(s) 110A providing system security controller(s) $150_{CURRENT}$ for the system 100. In one example, a portion of the peer devices 110 included in the system 100 may serve as co-system security controllers 150, each having similar functionality as described in detail below. In another example, all of the peer devices 110 included in the network may serve as co-system security controllers 150, each having similar functionality as described in detail below.

The peer devices 110 include any number and/or combination of currently-available or future developed processor-based devices. For example, the peer devices 110 may include a number of portable computing devices, smartphones, wearable computing devices, laptop computers, and/or desktop computers. In some implementations, each of the peer devices 110 may include a virtual peer device resident on and/or executed by a physical processor-based device. For example, each of a number of processor based devices such as a number of servers may be disposed in separate geographically remote areas and each may be represented by a peer device 110 that is local to the respective server. Thus, in addition to rotating security controller responsibilities among some or all of the peer devices 110, it beneficially becomes possible to rotate security controller responsibilities across various geographic/geopolitical regions where the physical and/or virtual peer devices 110 are located.

The communications interface 112 includes any number and/or combination of currently available or future developed devices and/or systems capable of supporting unidirectional or bidirectional communication between peer devices 110 and/or between peer devices 110 and the peer device 110A providing the system security controller 150. The communications interface 112 may include any number and/or combination of wired and/or wireless interfaces. In some implementations, the communications interface 112 may include a one or more wireless communications interfaces such as, a cellular communications interface, a BLUETOOTH® communications interface, or an IEEE 802.11 (Wi-Fi) communications interface.

The storage device 114 includes any number and/or combination of currently available or future developed storage devices and/or systems capable of storing or otherwise retaining rulesets used by the peer devices 110 and/or the peer device 110A providing the system security controller 150. For example, the storage device 114 may store or otherwise retain one or more trust assessment rulesets used by a peer device 110 to assess the trustworthiness of the peer device 110A providing the system security controller 150. In another example, the storage device 114 may store or otherwise retain one or more primary device election rulesets used by one or more peer devices 110 to select, elect, or otherwise nominate another peer device 110A as a new system security controller $150_{NEW}$. In another example, the storage device 114 may store or otherwise retain one or more threat assessment ruleset used by the peer device 110A providing the system security controller 150 to compile and/or evaluate the threat and/or security risk information and/or data received from some or all of the peer devices 110. In some implementations, the storage device 114 may be local to the peer device 110.

In some implementations, the storage device 114 may be remote from the peer device 110, for example, the storage device 114 may be disposed in whole or in part in, on, or about one or more cloud-based servers communicably coupled to the peer device 110 via network 140. In such an implementation, some or all of the peer devices 110 may access a common ruleset on the remote server or similar remote storage device. Such an implementation beneficially provides all peer devices 110 with access to a common ruleset.

In embodiments, the at least one processor 120 includes a plurality of configurable electronic components, semiconductor devices, and/or logic elements that may be hardwired to configurable via machine-executable instruction sets to provide specialized and particular circuitry. Such circuitry may include one or more dedicated components arranged to provide circuitry having specific and defined functionality. In addition, the at least one processor 120 may be capable of contemporaneously or simultaneously providing any number or type of function specific circuits. For example, the at least one processor 120 in each of the peer devices 110 may provide function specific circuitry that enables the respective peer device 110 to perform standard functions such as evaluating the trust level and/or trustworthiness of the peer device 110A providing the system security controller 150. The at least one processor may include one or more circuits that provide each of the peer devices 110 the capability of selecting, electing, or otherwise nominating one or more peer devices 110A as a new system security controller $150_{NEW}$. In addition to the standard functions performed by a peer device 110, the at least one processor 120 in the peer device 110A providing the system security controller 150 may also provide function specific circuitry that enables the peer device 110A to perform the specialized functions such as compiling threat and security information and transferring compiled security and threat information to peer device 110A providing the newly selected, elected, or nominated system security controller $150_{NEW}$.

As depicted in FIG. 1, circuitry that includes black text on a light background may be considered ACTIVE while circuitry that includes white text on a dark background may be considered INACTIVE. In embodiments, each of the peer devices 110 carries a processor capable of providing a full complement of circuitry, however only in the peer device 110A is the circuitry associated with fulfilling the role of system security controller 150 ACTIVE—in the other peer devices 110 within the system 100, the circuitry associated with fulfilling the role of system security controller 150 is INACTIVE.

The at least one processor 120 includes monitoring circuitry 122 to collect information and/or data from at least one other of the plurality of peer devices 110. In some implementations, the monitoring circuitry 122 draws, pulls, collects, or otherwise receives information and/or data indicative of the level of trust in and/or trustworthiness of the peer device 110A providing the system security controller 150. Such information and/or data received from the peer device 110A may include, but is not limited to, information and/or data representative or indicative of: system security controller 150 data integrity; system security controller 150 data age; system security controller 150 data relevance; system security controller 150 time stamp; system security controller 150 geographic location; system security controller 150 virtual location, a whitelist of trusted peer devices 110; and/or a blacklist of untrusted peer devices 110.

The at least one processor 120 further includes trust assessment circuitry 124 that permits the peer device 110 to apply the at least one trust assessment ruleset to the information and/or data collected from the at least one other peer device 110. In some implementations, the trust assessment circuitry 124 permits the peer device 110 to apply the at least one trust assessment ruleset to the information and/or data collected from the peer device 110A fulfilling the role of system security controller 150. In some implementations, each of the peer devices 110 independently assess the trustworthiness and/or security of the peer device 110A providing the system security controller 150 using the information and/or data collected from the peer device 110A fulfilling the role of system security controller 150. In some implementations, each of the peer devices 110 uses information and/or data collected from the peer device 110A providing the system security controller 150 to collectively or collaboratively assess the trustworthiness and/or security of the peer device 110A fulfilling the role of system security controller 150.

The at least one processor 120 additionally includes election circuitry 126 to apply the at least one primary device election ruleset to elect, nominate, or otherwise select a peer device 110 as a new system security controller $150_{NEW}$. In some implementations, such an election of peer device 110A to fulfill the role of system security controller 150 occurs on a timed basis at regular, irregular, periodic, intermittent, or aperiodic intervals. In some implementations, such an election of a primary device 110A to fulfill the role of system security controller 150 occurs on an event driven basis. For example, when one or more of the peer devices 110 determines the peer device 110A currently fulfilling the role of system security controller 150 is no longer trustworthy and/or secure.

The at least one processor 120 may include authentication circuitry 128. In some implementations, the authentication circuitry 128 may be used to authenticate a first peer device 110 to one or more other peer devices 110. In some implementations, the authentication circuitry 128 may be used to authenticate a peer device 110 to the peer device 110A serving as the system security controller 150. In some implementations, the peer device 110A fulfilling the role of system security controller 150 may authenticate some or all of the peer devices 110 included in the system 100. In some implementations, the authentication circuitry 128 may be used to authenticate some or all of the peer devices 110 to an external entity, such as an authentication server. In some implementations, the authentication circuitry 128 may be used to authenticate some the peer device 110A fulfilling the role of system security controller 150 to an external entity, such as an authentication server. Such authentication may include any currently available or future developed authentication technology.

The at least one processor 120 includes additional circuitry that provides additional functionality related to providing the system security controller 150. Although each of the peer devices 110 includes the circuitry to function as a system security controller 150, in embodiments, such circuitry may only be active on those peer device(s) 110A currently fulfilling the role of system security controller(s) 150. The peer device 110A serving as system security controller 150 collects security and/or threat related information and/or data from at least some of the peer devices 110 included in the system 100. The primary device 110A uses the collected threat and/or security information and/or data to identify and/or assess threats and/or comprised device and/or network security. In at least some implementations, the primary device 110A may add peer devices 110 identified as presenting a threat or security risk to a peer device blacklist identifying untrusted peer devices that is shared among the peer devices 110 in the system 100. In some implementations, the primary device 110A may remove peer devices identified as presenting a threat or security risk from a peer device whitelist identifying trusted peer devices that is shared among the peer devices 110 in the system 100.

The at least one processor 120 in the peer device 110A fulfilling the role of system security controller 150 includes compilation circuitry 130 to compile the threat and/or security information and/or data received from at least some of the peer devices 110. In some implementations, the information and/or data may be pushed from some or all of the peer devices 110 to the peer device 110A fulfilling the role of system security controller 150. In some implementations, the information and/or data may be pulled by the peer device 110A fulfilling the role of system security controller 150 from some or all of the peer devices 110. The information and/or data may be transferred or otherwise communicated between the peer devices 110 and the peer device 110A fulfilling the role of system security controller 150 on a continuous, intermittent, periodic, or aperiodic basis. Such information and/or compilation of threat and/or security information and/or data beneficially permits the peer device 110A fulfilling the role of system security controller 150 to identify system-wide threats and/or compromised system-wide security that may not be easily identified at the peer device level.

The at least one processor 120 also includes threat assessment circuitry 132 to determine a respective value indicative of a defined security threat to at least one peer device 110. In at least some implementations, the peer device 110A fulfilling the role of system security controller 150 compiles the information and/or data received from some of all of the peer devices 110 to assess individual threats and/or security risks to some or all of the peer devices 110 and/or system-wide threats and/or security risks to all or a portion of the peer device system 100. In some implementations, the threat assessment circuitry 132 may weight or otherwise compensate the received information and/or data based on one or more factors. Such factors may include, but are not limited to, a level of trust in the peer device 110 providing the information and/or data (e.g., information received from blacklisted untrusted peer devices 110 is weighted lower than information received from whitelisted trusted peer devices 110).

The at least one processor 120 additionally includes rollover circuitry 134 to communicate at least a portion of the information and/or data compiled by the compilation circuitry 130 in the peer device 110A providing the system security controller 150 to a peer device 110A selected, elected, or otherwise nominated to fulfill the role of system security controller 150. The peer device 110A fulfilling the role of system security controller 150 may store or otherwise retain, either in local memory or remotely at one or more network storage devices, the compiled threat and security risk information received from some or all of the peer devices 110. In some implementations, the compiled threat and security risk information may be retained for a limited time period (e.g., 1 hour, 1 day, 1 week, 1 month, 1 year).

The at least one processor 120 also includes threat abatement circuitry 136 to remediate corrupted information and/or data received by the peer device 110A providing the system security controller 150. In embodiments, such corrupted information and/or data may be received by the peer device 110A fulfilling the role of system security controller 150 from the peer device 110 formerly fulfilling the role of system security controller $150_{OLD}$. In embodiments, such corrupted information and/or data may be received by the peer device 110A fulfilling the role of system security controller 150 from one or more peer devices 110 included in the network 100.

The at least one processor 120 also includes transferred information assessment circuitry 138 to assess the information and/or data received by the peer device 110A currently fulfilling the role of system security controller 150 from the peer device 110 that formerly fulfilled the role of system security controller $150_{OLD}$. The transferred information assessment circuitry 138 ensures the information and/or data received by the peer device 110A fulfilling the role of system security controller 150 is accurate, uncorrupted, and trustworthy.

The network 140 may include any number and/or combination of local and/or wide area capable of communicably coupling some or all of the peer devices 110 forming the system 100. Example networks include, but are not limited to: local area networks (LANs); wireless local area networks (WLANs); personal area networks (PANs); wide area networks (WANs); wireless wide area networks (WWANs); metropolitan area networks (MANs); worldwide networks (Internet), or any number and/or combination thereof.

Figure 2:
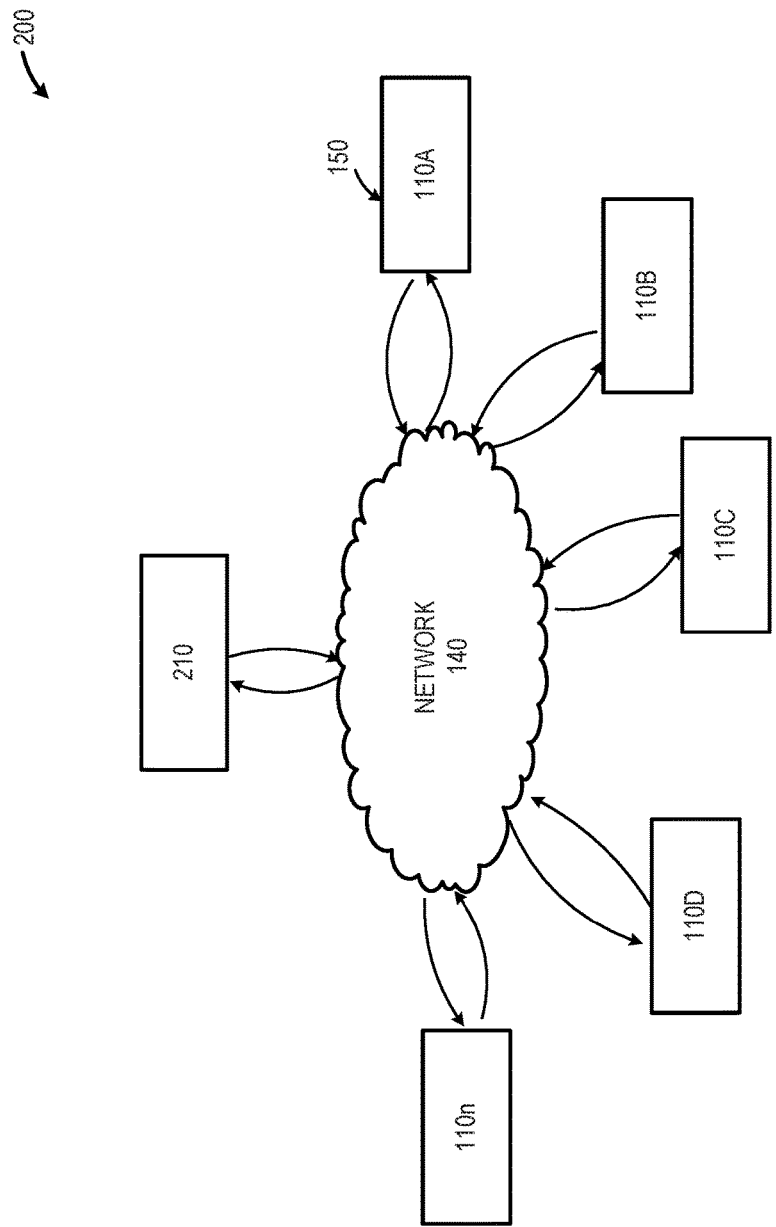
FIG. 2 is another illustrative round-robin security system that includes a remote server used for one or more functions by the peer devices and/or the primary device, in accordance with at least one embodiment described herein.

FIG. 2 depicts another illustrative round-robin security system 200 that includes a remote server 210 used for one or more functions by the peer devices 110 and/or the peer device 110A fulfilling the role of system security controller 150, in accordance with at least one embodiment described herein. In some implementations, the remote server 210 may authenticate some or all of the peer devices 110 as members of the round-robin security system 200. In some implementations, the remote server 210 may continuously, periodically, or intermittently authenticate at least some of the peer devices 110 as members of the round-robin security system 200. In some implementations, the remote server 210 may continuously, periodically, or intermittently authenticate at least the peer device(s) 110A currently fulfilling the role of system security controller(s) 150. In some implementations, the remote server 210 may authenticate the peer device 110 selected, elected, or otherwise nominated as the new primary device $110A_{NEW}$, in at least some implementations, the remote server 210 may authenticate the new primary device $110A_{NEW}$ prior to the transfer of information and/or data from the current primary device $110A_{CURRENT}$ to the new primary device $110A_{NEW}$.

In some implementations, the remote server 210 may store or otherwise retain the trust assessment ruleset used by the peer devices 110 to assess the trustworthiness of the peer device(s) 110A fulfilling the role of system security controller(s) 150 may be stored or otherwise retained on one or more storage device 114 communicably coupled to the remote server 210. In some implementations, the primary device election ruleset used by the peer devices 110 to select, elect, or otherwise nominate a peer device 110A to function as the system security controller 150 may be stored or otherwise retained on one or more storage devices 114 communicably coupled to the remote server 210. Such remote storage of a single ruleset accessed by all peer devices 110 included in the plurality of networked peer devices beneficially ensures the application of a common ruleset by all peer devices 110. Also updates or replacement of the rulesets may be achieved without the need for pushing the update or replacement rulesets to each of the peer devices 110. In some implementations, the remote server 210 may store or otherwise retain the threat assessment ruleset used by the primary device 110A fulfilling the role of system security controller 150 to receive and assess threat and/or security risk information and/or data from at least some of the peer devices 110.

In some implementations, upon selection, election, and/or nomination, a peer device 110A that has been selected, elected, or otherwise nominated to function as a system security controller 150 may contact the remote server 210 to obtain one or more rulesets (e.g., the threat assessment rulesets) and/or one or more sets of machine-readable instructions used by the peer device 110A fulfilling the role of system security controller 150. In other implementations, the respective storage device 114 in each of the peer devices 110 may store or otherwise retain the one or more rulesets (e.g., the threat assessment rulesets) and/or one or more sets of machine-readable instructions that are loaded and/or used by the one or more processors 120 in a peer device 110 when the respective peer device is selected, elected, or nominated to fulfill the role of system security controller 150.

Figure 3:
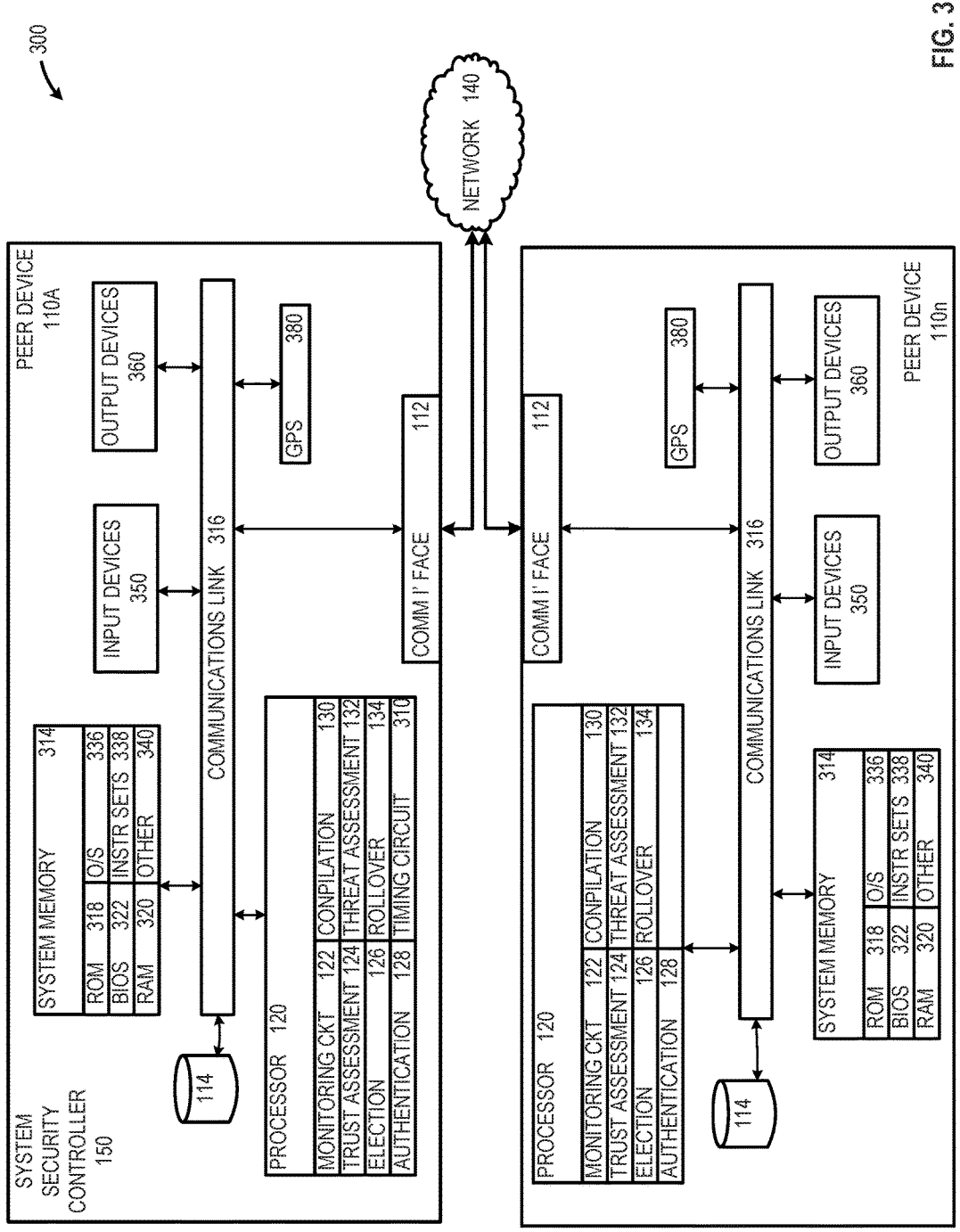
FIG. 3 is an example peer device and an example system security controller useful with the systems and depicted in FIGS. 1 and 2, in accordance with at least one embodiment described herein.

FIG. 3 and the following discussion provide a brief, general description of the components forming an illustrative round-robin security system 300 that includes one or more peer devices 110n and one or more peer devices 110A serving as the system security controller 150, in accordance with at least one embodiment described herein. The additional system security controller related circuitry differentiates peer device 110A currently fulfilling the role of system security controller 150 from each of the other peer devices 110 included in system 100. It should be noted all of the peer devices 110, including peer device 110A fulfilling the role of system security controller 150, share a common ruleset and circuitry core that includes, but is not limited to, rulesets trust assessment rulesets, system security controller election rulesets) and/or circuitry (e.g., monitoring circuitry, trust assessment circuitry, election circuitry). From a different perspective, it is only the additional rulesets (e.g., threat assessment rulesets) and/or additional circuitry (e.g., compilation circuitry, threat assessment circuitry, rollover circuitry) that differentiates the peer device 110A fulfilling the role of system security controller 150 from the other peer devices 110B-110n within the system 100.

It is this duplication of capabilities between peer devices 110 and the ability for any one (or more) of the peer devices to fulfill the role of system security controller 150 that advantageously provides a flexible system in which geographically diverse peer devices 110 may, at any time, be able to fulfill the role of system security controller 150. Furthermore, since peer devices 110 each include circuitry and rulesets that allow the respective peer device to function as a peer device 110 or as the system security controller 150, the peer devices 110 are able to select, elect, or nominate one (or more) of their own to provide the system security controller 150 for the system 100. Although not required, some portion of the embodiments will be described in the general context of machine-readable or computer-executable instruction sets, such as program application modules, objects, or macros being executed by the one or more peer devices 110 and the system security controller 150.

As depicted in FIG. 3, the peer devices 110, including the peer device(s) 110 fulfilling the role of system security controller(s) 150, include one or more processors 120, each having, forming, or otherwise providing various circuits or circuitry, such as some or all of: the monitoring circuitry 122, the trust assessment circuitry 124, and the election circuitry 126. In some implementations, the peer devices 110, including the peer device(s) 110 fulfilling the role of system security controller(s) 150, include one or more processors 120 that may include authentication circuitry 128. The one or more processors 120 in the peer device(s) 110 fulfilling the role of system security controller(s) 150 may additionally have, form, or otherwise provide various circuits or circuitry associated with the role of the peer device(s) 110 as system security controller(s) 150, such as some or all of: compilation circuitry 130, threat assessment circuitry 132, and/or rollover circuitry 134. Such circuitry may be implemented in the form of hardwired circuits, programmable circuits, controllers, signal processors, processors, microprocessors, programmable gate arrays, or combinations thereof.

Those skilled in the relevant art will appreciate that the illustrated embodiments as well as other embodiments can be practiced with other circuit-based device configurations, including portable electronic or handheld electronic devices, for instance smartphones, portable computers, wearable computers, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked via a communications network. In a distributed computing environment, program modules may be located in both local and remote memory storage devices.

The one or more processors 120 in each of the peer devices 110 may include a variety of electronic and/or semiconductor components that are disposed partially or wholly in a wearable computer, portable computing device, personal digital assistant, personal computer, or other similar currently available or future developed processor-based device and/or system capable of executing machine-readable instructions. The one or more processors 120 are operably and/or communicably coupled to various components within the peer device 110 via one or more communications links 316. As depicted in FIG. 3, the communications link 316 communicably coupled various system components, such as a system memory 314, to the one or more processors 120. The peer device 110 may, at times, be referred to in the singular herein, but this is not intended to limit the embodiments to a single system, since in certain embodiments, there will be a plurality of peer devices 110A-110n or other networked systems, circuits, or devices involved.

Each of the processors 120 may include any number, type, or combination of conductors, insulators, electrical devices, and/or semiconductor components. At times, each of the processors 120, including all or a portion of the circuits and/or circuitry implemented by each of the peer devices 110 and/or the circuits and/or circuitry implemented by the peer device(s) 110A providing the system security controller(s) 150, may be implemented in whole or in part in the form of semiconductor devices such as diodes, transistors, inductors, capacitors, and resistors. Such an implementation may include, but is not limited to any current or future developed single- or multi-core processor or microprocessor, such as: one or more systems on a chip (SOCs); one or more central processing units (CPUs); one or more digital signal processors (DSPs); one or more graphics processing units (GPUs); one or more application-specific integrated circuits (ASICs), one or more field programmable gate arrays (FPGAs), and the like. Unless described otherwise, the construction and operation of the various blocks illustrated in FIG. 3 are of conventional design. As a result, such blocks need not be described in further detail herein, as they are readily understood by those skilled in the relevant art. The communications link 316 interconnecting at least some of the components in the peer devices 110 and in the peer device(s) 110A serving as system security controller(s) 150 employs any known serial or parallel bus structures or architectures.

The system memory 314 may include read-only memory ("ROM") 318 and random access memory ("RAM") 320. A portion of the ROM 318 may contain a basic input/output system ("BIOS") 322. The BIOS 322 provides basic functionality for the peer device 110, for example by causing the one or more processors 120 to load one or more machine-readable instruction sets that cause the peer device 110 to monitor the system security controller 150, perform trust assessment(s) on the system security controller 150, cause a selection, election, or nomination of a new system security controller 150, and/or perform one or more peer device authentications. The BIOS 322 in the peer device(s) 110A providing the system security controller(s) 150 may additionally cause the one or more processors in the peer device(s) 110A to load one or more machine-readable instruction sets that cause the peer device(s) 110A to compile threat assessment and security risk information and/or data received from the peer devices 110, perform threat assessments on the compiled threat assessment and security risk information and/or data, and also to forward threat assessment and/or security risk information to one or more peer device(s) 110A selected, elected, or otherwise nominated to provide new system security controller(s) $150_{NEW}$.

Each of the peer devices 110 includes one or more communicably coupled, non-transitory, data storage devices 114. The one or more data storage devices 114 may include any number and/or combination of any current or future developed non-transitory storage devices. Non-limiting examples of such non-transitory data storage devices 114 may include, but are not limited to one or more magnetic storage devices, one or more optical storage devices, one or more solid-state electromagnetic storage devices, one or more electroresistive storage devices, one or more molecular storage devices, one or more quantum storage devices, or various combinations thereof.

Each of the peer devices 110 includes one or more timing circuits 310. The one or more timing circuits 310 may be used as resettable or non-resettable timing devices, systems, and/or circuits. In some implementations, a timing circuit 310 in some or all of the peer devices 110 tracks the elapsed time at least some of the peer device(s) 110A function as system security controller(s) 150.

The one or more storage devices 114 may include interfaces or controllers (not shown) communicatively coupling the respective storage device(s) 114 to the one or more communications link 316, as is known by those skilled in the art. The one or more storage devices 114 may store, retain, or otherwise include a number of machine-readable instruction sets, data structures, program modules, and other data useful to the respective peer device 110 to which the storage device 114 is coupled. In some instances, one or more servers 210 may be communicably coupled to some or all of the peer devices 110. In one example, the server 210 may include one or more remote server based storage devices or "cloud" storage devices that are bidirectionally communicably coupled to the peer device 110 via one or more external communication networks, such as one or more wireless networks (e.g., IEEE 802.11"Wi-Fi"), one or more wired networks (e.g., IEEE 802.3"Ethernet"), or combinations thereof.

The system memory 314 also includes an operating system 336 used by the peer device 110, one or more machine-readable instruction sets and/or applications 338, and housekeeping instruction sets 340. Such instruction sets may be transferred from the one or more storage devices 114 and stored in the system memory 314 in whole or in part for execution by the one or more processors 120. The machine-readable instruction sets 338 may include instructions and/or logic that provides the peer devices 110 and the peer device(s) 110A providing the system security controller(s) 150 with the functionality and capabilities described herein.

For example, one or more machine-readable instruction sets 338 may cause the monitoring circuit 122 in the peer device 110 to poll or otherwise receive information and/or data from the peer device(s) 110A providing the system security controller(s) 150. Such information and/or data may include, but is not limited to, information and/or data indicative or representative of a level of trust or trustworthiness of the peer device(s) 110A providing the system security controller(s) 150. The peer device 110 may receive the information and/or data from the peer device(s) 110A providing the system security controller(s) 150 on a periodic, aperiodic, intermittent, or continuous basis.

In another example, the one or more machine-readable instruction sets 338 may cause the threat assessment circuitry 124 in the peer device 110 to apply one or more threat assessment rulesets to the information and/or data received from the peer device(s) 110A providing the system security controller(s) 150 to determine a value indicative of a respective level of trust or trustworthiness associated with each of the system security controller(s) 150. In some implementations, the one or more threat assessment rulesets may be stored or otherwise retained in, on, or about the storage device 114 in each respective peer device 110 included in the system 100. In some implementations, the one or more threat assessment rulesets may be stored or otherwise retained in, on, or about the remote server 210 and may be accessed via the network 140 by each respective peer device 110 included in the system 100.

The one or more machine-readable instructions sets 338 may cause the election circuitry 126 in the peer device 110 to apply one or more system security controller election rulesets to cause the selection, election, or nomination of one or more peer device(s) 110 as new system security controller(s) 150. For example, one system security controller election ruleset may select, elect, or nominate at least one of the peer devices 110 as a new system security controller $150_{NEW}$ when one or more of the peer devices 110 determines a level of trustworthiness in the current peer device 110A functioning as the system security controller 150 has fallen below a defined minimum threshold value. In another example, the system security controller election ruleset may select, elect, or nominate a peer device 110 having the highest trustworthiness value or appearing on a whitelist as the new system security controller 150. In another example, the system security controller election ruleset may cause the peer device 110 to select, elect, or nominate a peer device 110 as a new system security controller 150 in response to expiration of a system security controller rotation timer (i.e., the system security controller 150 is periodically rotated among some or all of the peer devices 110 included in system 100). In other embodiments, some or all of the system security controller election rulesets may be combined to provide, for example, periodic rotation of the system security controller responsibilities among a group of peer devices 110 that are included on a whitelist that includes trusted or trustworthy peer devices 110. In another example, some or all of the system security controller election rulesets may be combined to provide periodic rotation of system security controller responsibilities among a group of peer devices 110 that do not appear on a blacklist that includes untrusted or untrustworthy peer devices 110.

The one or more machine-readable instruction sets 338 may cause the authentication circuitry 128 in the peer device 110 to provide authentication information and/or data to one or more peer devices 110 and/or the remote server 210. Any currently available or future developed authentication processes may be employed to authenticate the peer devices 110 (e.g., public/private key). The authentication process for each peer device 110 may contribute to the level of trust and/or trustworthiness of the placed in the respective peer device 110 (i.e., an authentication failure may reduce the level of trust placed in the peer device 110, may result in the peer device 110 being placed on a blacklist until successfully authenticated, or may result in the peer device 110 being removed from a whitelist until successfully authenticated).

The one or more machine-readable instruction sets 338 may cause the compilation circuitry 130 in peer device(s) 110A functioning as system security controller(s) 150 to compile threat detection and/or security risk information and/or data obtained from some or all of the peer devices 110. Such information compilation may include, but is not limited to, comparison of the collected information and/or data to ensure data coherency or consistency, and similar. In some embodiments, all or a portion of the compiled information and/or data may be stored locally within the peer device(s) 110A providing the system security controller(s) 150. In other embodiments, all or a portion of the compiled information and/or data may be stored remotely, for example on one or more remote servers 210.

The one or more machine-readable instruction sets 338 may cause the threat assessment circuitry 132 in peer device(s) 110A functioning as system security controller(s) 150 to apply one or more threat assessment rulesets to the compiled information and/or data obtained or otherwise collected from the peer devices 110. The threat assessment circuitry 132 identifies potential threats and security risks across the system 100. Such threats and security risks may not be detectable or apparent on a peer device level, however by collecting information and/or data on a systemwide basis, the threat assessment circuitry 132 is able to beneficially identify threats and security risks existent within the system 100. The threat assessment circuitry 132 may also detect threats and/or security risks at an earlier stage than an individual peer device 110, thereby enabling more prompt action to ameliorate or eliminate the impact of the threat or security risk.

The one or more machine-readable instruction sets 338 may cause the rollover circuitry 134 in peer device(s) 110A functioning as system security controller(s) 150 to transfer or otherwise communicate threat assessment and/or security risk information and/or data to a peer device 110 that has been selected, elected, or nominated as a new system security controller $150_{NEW}$. In embodiments, the one or more machine-readable instruction sets 338 may alternatively or additionally cause the rollover circuitry 134 in peer device(s) 110A functioning as system security controller(s) 150 to transfer or otherwise communicate threat assessment and/or security risk data received from the peer devices 110 to a peer device 110 that has been selected, elected, or nominated as a new system security controller $150_{NEW}$. In some implementations, such a rollover of information and/or data may occur subsequent to an election performed by at least a portion of the peer devices 110. In some implementations, the rollover of information and/or data may occur at periodic or intermittent intervals in conjunction with the selection, election or nomination of one or more peer device(s) 110 as system security controller(s) 150.

Each peer device 110 may include one or more communicably coupled physical input devices 350, such as one or more text entry devices (e.g., keyboard), one or more pointing devices (e.g., mouse, trackball, touchscreen), and/or one or more audio input devices. Such physical input devices 350 may be used, for example, to provide, enter, or otherwise supply commands (e.g., acknowledgements, selections, confirmations, and similar) as well as information (e.g., acknowledgements, corrected subject identifiers, and similar) to the at least one processor 120. Each peer device 110 may include one or more communicably coupled physical output devices 360, such as one or more visual output devices (e.g., a display device), one or more tactile output devices (e.g., haptic feedback or similar), one or more audio output devices, or any combination thereof. Each peer device 110 may include a geolocation transmitter or transceiver capable of providing information and/or data indicative of the geolocation of the respective peer device 110.

For convenience, the communication interface 112, the number at least one processor 120, the system memory 314, the physical input devices 350 and the physical output devices 360 are illustrated as communicatively coupled to each other via the communications link 316, thereby providing connectivity between the above-described components. In alternative embodiments, the above-described components may be communicatively coupled in a different manner than illustrated in FIG. 3. For example, one or more of the above-described components may be directly coupled to other components, or may be coupled to each other, via one or more intermediary components (not shown). In some embodiments, the communications link 316 may be omitted and the components are coupled directly to each other using suitable wired or wireless connections.

Figure 4:
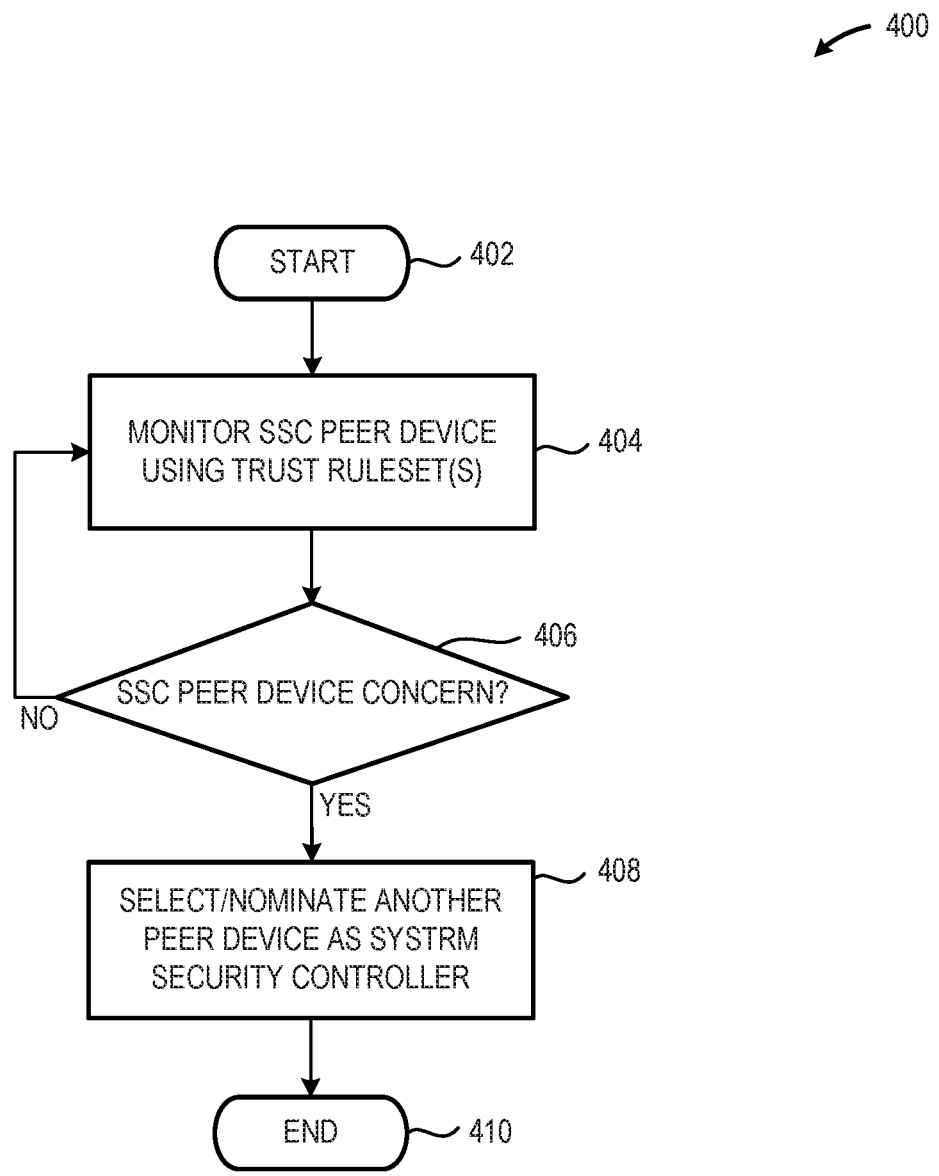
FIG. 4 is a high-level flow diagram of an illustrative round-robin security method in which system security controller responsibilities rotate among at least a portion of the peer devices included in the network, in accordance with at least one embodiment described herein.

FIG. 4 provides a high-level flow diagram of an illustrative round-robin security method 400, in accordance with at least one embodiment described herein. Each of the peer devices 110 included in a round-robin security system such as that depicted in FIG. 1 includes a minimum complement of rulesets and circuitry that enable the peer device 110 to function within the system 100. Each of the peer devices 110 included in the round-robin security system also includes a minimum complement of rulesets and circuitry that enable any of the peer devices 110 included in the plurality of networked peer devices 110 forming the system 100 to function as a system security controller 150. The threat assessment and security risk assessment duties associated with the system security controller 150 may rotate among some or all of the peer devices 110 forming the system 100. In embodiments, system security controller responsibilities may rotate among some or all of the peer devices 110 on a periodic, aperiodic, or intermittent temporal basis. In embodiments, system security controller responsibilities may rotate among some or all of the peer devices 110 on an event driven basis, for example when one or more of the peer devices determines the current system security controller(s) 150 is/are in a reduced trust or untrustworthy state. The method 400 commences at 402.

At 404, some or all of the peer devices 110 in the round-robin security system 100 monitor at least one other peer device 110x included in the round-robin security system 100 to determine a level of trust or trustworthiness in the at least one other peer device 110x. In some implementations, the at least one other peer device 110x monitored by some or all of the peer devices 110 included in the round-robin security system 100 includes the peer device(s) 110A functioning as and/or providing the system security controller(s) 150. Some or all of the peer devices 110 may perform such monitoring by polling the at least one other peer device 110x on a periodic, an aperiodic, an intermittent, or a continuous basis. Some or all of the peer devices 110 may perform such monitoring by receiving information and/or data broadcast by the at least one other peer device 110x on a periodic, an aperiodic, an intermittent, or a continuous basis. In some implementations, the at least one other peer device 110x may report information and/or data to the remote server 210 and the remote server 210 may transmit some or all of the information and/or data to the peer devices 110 on a periodic, an aperiodic, an intermittent, or a continuous basis. In some implementations, the at least one other peer device 110x may report information and/or data to the remote server 210 and some or all of the peer devices 110 may poll the remote server 210 for the information and/or data on a periodic, an aperiodic, an intermittent, or a continuous basis.

The information and/or data communicated to each of at least some of the peer devices 110 may include, but is not limited to, the point of origin (e.g., geolocation, Internet Protocol address, virtual connection, and similar) of the at least one other device 110x, the start time the at least one other peer device 110A assumed the role of system security controller 150, the end time the at least one other peer device 110A relinquished the role of system security controller 150, the reason the at least one other peer device 110A assumed the role of system security controller 150, and/or the reason the at least one other peer device 110A relinquished the role of system security controller 150.

At 406, the peer devices 110 receiving the information and/or data apply one or more trust assessment rulesets to the received information and/or data. The trust assessment rulesets include defined criterion that enable the peer devices 110 to evaluate the level of trust or trustworthiness of the at least one other peer device 110x being evaluated. Defined criterion included in the trust assessment rulesets may include, but are not limited to, data integrity, data age, data relevance, time stamp information, geographic location of the at least one other peer device 110x, virtual location of the at least one other peer device 110x, whether the at least one other peer device 110x is included in a whitelist, and/or whether the at least on other peer device 110x is included in a blacklist.

If the level of trust or trustworthiness of the at least one other peer device 110x is found satisfactory by the peer devices 110, method 400 returns to 404. If the level of trust in or trustworthiness of the at least one other peer device 110x is found unsatisfactory, the method 400 continues to 408.

At 408, at least one of the peer devices 110 notifies the at least one other peer device 110x of the trust assessment. In instances where the at least one other peer device 110A represents a system security controller 150, upon notification of the unsatisfactory trust assessment, the peer device 110A functioning as the current system security controller $150_{CURRENT}$ transfers the system security controller responsibilities to a different peer device 110 that assumes the responsibilities of system security controller 150. The method 400 concludes at 410.

Figure 5:
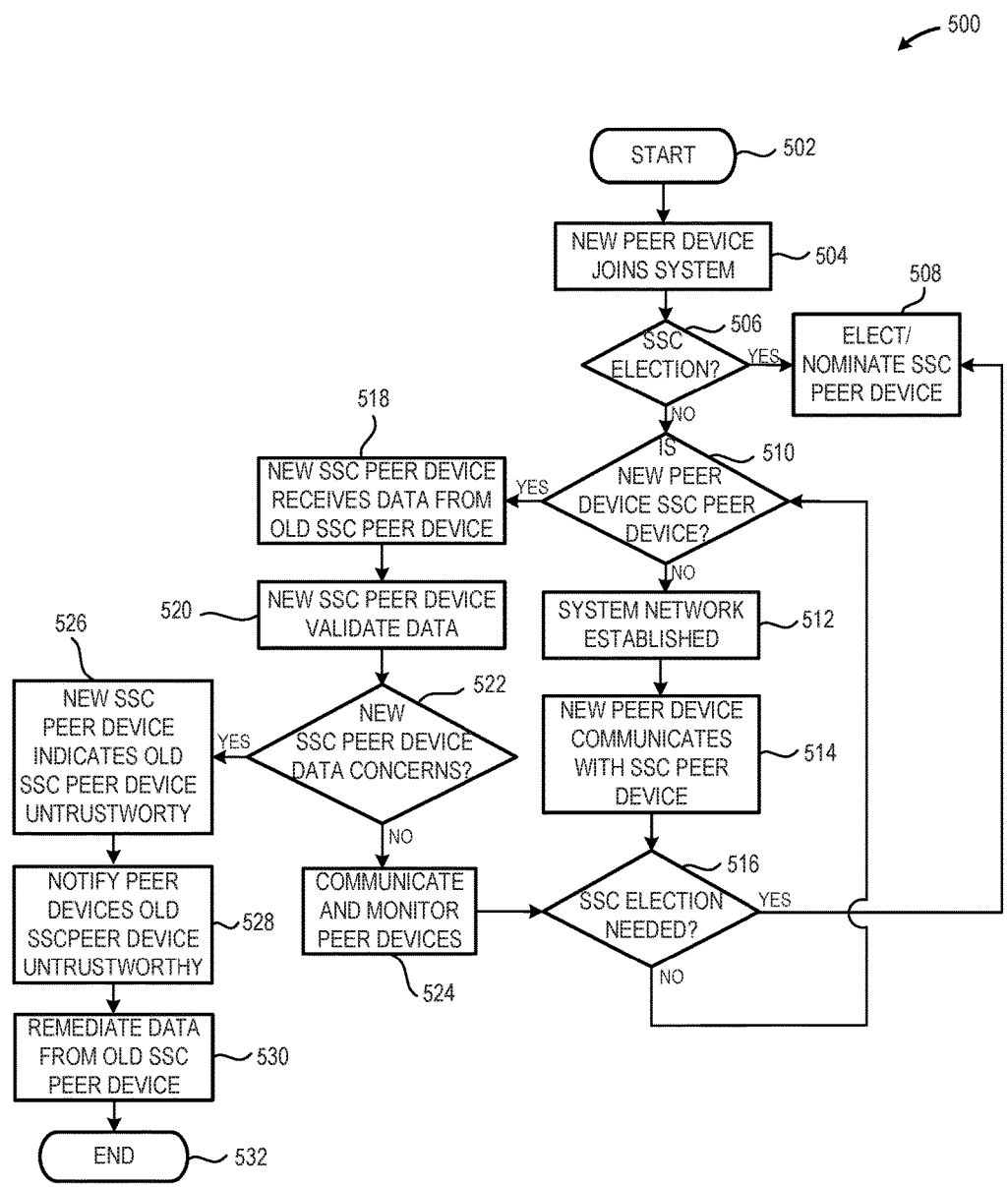
FIG. 5 is a high-level flow diagram of an illustrative round-robin security method viewed from the perspective of a peer device participating as a system security controller in the round-robin security system, in accordance with at least one embodiment described herein.

FIG. 5 provides a high-level flow diagram of an illustrative round-robin security method 500 viewed from the perspective of a peer device 110 in the round-robin security system 100, in accordance with at least one embodiment described herein. The method 500 commences at 502.

At 504, the peer device 110 joins the round-robin security system 100. Such joining may occur passively, for example as a result of the peer device 110 moving to within a defined range or geographic area in which the round-robin security system 100 has been established.

At 506, at least some of the peer devices 110 included in the round-robin security system 100 determine whether an election is necessary to select, elect, or nominate at least one of the peer devices 110 to function as the system security controller 150. In embodiments, the peer devices 110 may determine an election is needed based on the duration that one or more peer devices 110A have served as system security controller(s) 150. In embodiments, the peer devices 110 may determine an election is needed based on the level of trust or trustworthiness of the existing peer devices 110A serving as system security controller(s) 150 does not meet or does not satisfy one or more defined thresholds based on one or more trust assessment rulesets. If an election is needed, some or all of the peer devices 110 conduct the election at 508.

At 510, each peer device 110 in the system 100 determines whether they have been selected, elected, or nominated as the system security controller 150. If the peer device 110 has been selected, elected, or nominated as the system security controller 150, the method 500 continues at 518. If the peer device 110 has NOT been selected, elected, or nominated as the system security controller 150, the method 500 continues at 512.

At 512, the peer device 110 joins the round-robin security network 100. In some implementations, the peer device 110 may be authenticated by one or more other peer devices 110 in the system 100 prior to joining the peer device network. In some implementations, the peer device 110 may be authenticated by one or more network devices, such as one or more remote servers 210, prior to joining the peer device network.

At 514, after successfully joining the peer device network, the peer device 110 begins communicating with the system security controller(s) 150. In some implementations, the peer device 110 begins receiving information and/or data useful in determining the overall level of trust in the system security controller 150 and/or the level of trustworthiness in the system security controller 150.

At 516, the peer device 110 determines either alone or in conjunction with one or more other peer devices 110 whether an election is needed based upon the level of trust and/or trustworthiness of the system security controller 150. If an election is needed, the method 500 returns to 508. If an election is not needed, the method returns to 510.

At 518, the peer device 110, now in the role of system security controller 150, receives information and/or data from the peer device 110 that served as the former system security controller $150_{OLD}$. In some implementations, the information and/or data received by the peer device 110A serving as the new system security controller $150_{NEW}$ is representative or indicative of threat assessments and/or security risk assessments performed by the peer device 110 in the role as the former system security controller $150_{OLD}$.

At 520, peer device 110A, now acting as the system security controller 150, applies one or more threat assessment rulesets to the information and/or data received from the peer device 110 that served as the old system security controller $150_{OLD}$. In some implementations, such rulesets detect potential threats or security risks that exist if the former system security controller $150_{OLD}$ was compromised.

At 522, the peer device 110A acting in the role of system security controller 150 and based on the one or more threat assessment rulesets applied at 520, determines whether a threat or security risk to one or more peer devices 110 and/or a system-wide threat or security risk exists based on the information and/or data received from the peer device that served as the old system security controller $150_{OLD}$. If no threat or security risk is detected, the method 500 continues at 524 where the peer device 110A continues to monitor the peer devices 110 in the system 110 and continues to determine whether an election is needed at 516. If a threat or security risk posed by the old system security controller $150_{OLD}$ is detected at 522, the method 500 continues at 526.

At 526, the peer device 110A serving as the system security controller 150 flags the peer device 110 that served as the previous system security controller $150_{OLD}$ as suspicious. In some implementations, the peer device 110A serving as the system security controller 150 may add an identifier logically associated with the peer device 110 that served as the previous system security controller $150_{OLD}$ on a blacklist or similar list containing identifiers associated with untrusted or untrustworthy peer devices 110. In some implementations, the peer device 110A serving as the system security controller 150 may remove an identifier logically associated with the peer device 110 that served as the previous system security controller $150_{OLD}$ from a whitelist or similar list containing identifiers associated with trusted or trustworthy peer devices 110.

At 528, the peer device 110A notifies some or all of the peer devices 110 of the untrusted or untrustworthy status of the peer device 110 that served as the previous system security controller $150_{OLD}$.

At 530, the peer device 110A performs remedial actions on the information and/or data received from the peer device 110 that served as the previous system security controller $150_{OLD}$. In some implementations, the peer device 110A serving as the system security controller 150 may scrub all or a portion of the information and/or data received from the peer device 110 that served as the previous system security controller $150_{OLD}$. The method 500 concludes at 532.

Figure 6:
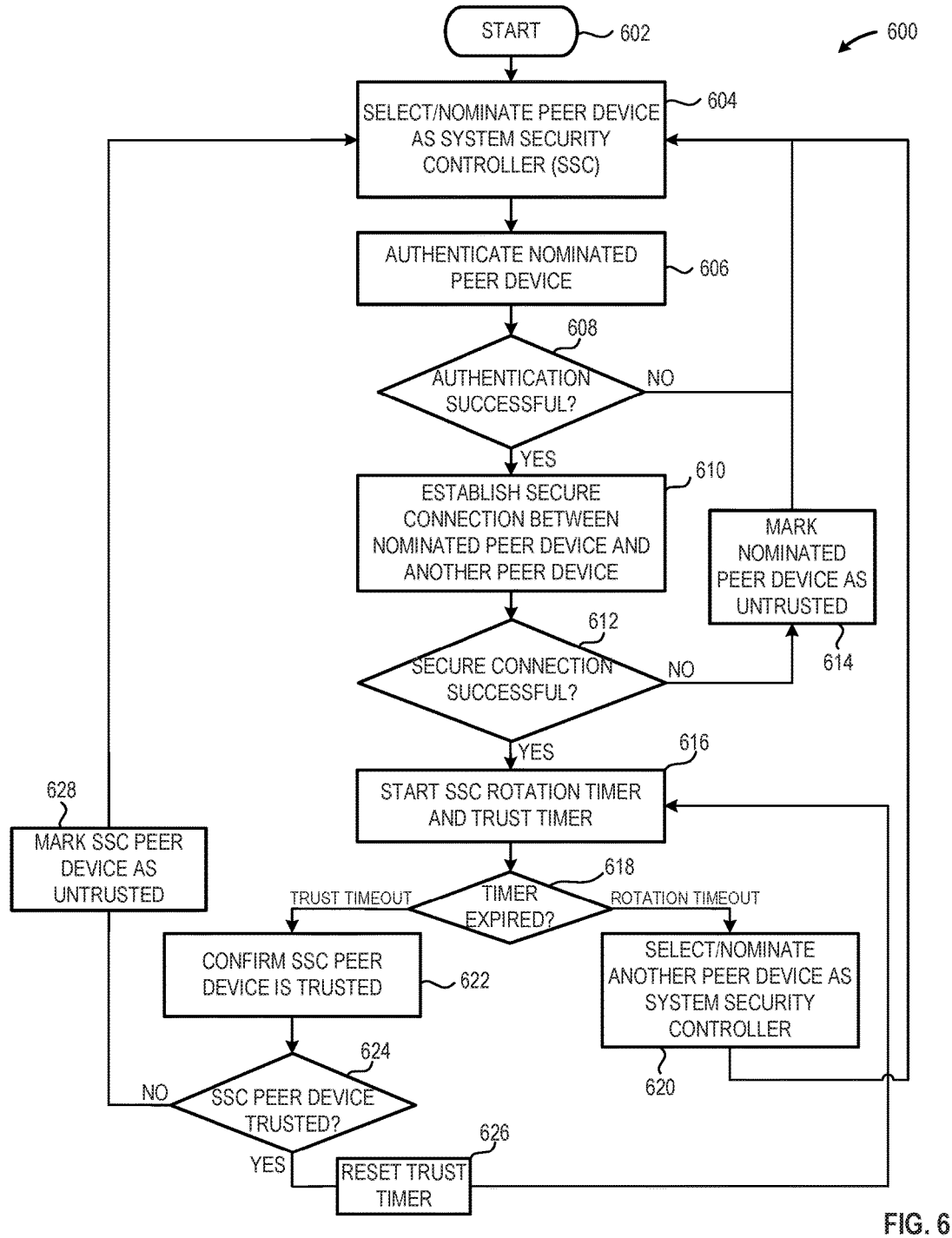
FIG. 6 provides a high-level flow diagram of an illustrative method of electing a peer device from among a plurality of peer devices as a system security controller, in accordance with at least one embodiment described herein.

FIG. 6 provides a high-level flow diagram of an illustrative method 600 of electing a peer device 110 from among a plurality of peer devices as a system security controller 150, in accordance with at least one embodiment described herein. In some implementations, the election process for a system security controller 150 may be based on one or more timers such that the system security controller 150 is rotated among some or all of the peer devices 110 on a periodic, aperiodic, or intermittent basis or on an event driven basis. The method 600 commences at 602.

At 604, the peer devices 110 in the system 100 select the peer device 110A having the highest Internet Protocol (IP) address as the presumptive new system security controller $150_{NEW}$. In embodiments, the peer devices 110 in the system 100 may select the peer device 110A using any ordered sequence. For example, although high-to-low selection based on IP address is described, those of skill in the relevant arts will readily appreciate other ordered selection sequences may be employed with equal effectiveness. Non-limiting examples include: low-to-high IP address; high-to-low media access control (MAC) address; or low-to-high MAC address. Further, ordered selections may include combinations of the above or any other selection criteria agreed upon by the peer devices 110.

At 606, the peer device 110A selected as the presumptive new system security controller $150_{NEW}$ is authenticated using a third party authentication. In at least some implementations, the third party authentication may be performed, at least in part, by a remote server 210.

At 608, if the authentication at 606 is unsuccessful, the method returns to 604 and the peer device 110 having the next highest IP address is selected as the presumptive new system security controller $150_{NEW}$. If the authentication at 606 is successful, the method continues to 610.

At 610, one or more peer devices 110 attempt to establish a secure connection with the peer device 110A that provides the system security controller 150. In some implementations, the peer devices 110 may establish a secure connection using shared keys from a network attached remote server 210.

At 612, if a secure connection is established with the peer device 110A serving as the system security controller 150, the method 600 proceeds to 615. If a secure connection is not established with the peer device 110A serving as the system security controller 150, the peer device 110A is designated an untrusted peer device, the method returns to 604 and the peer device 110 having the next highest IP address is selected as the presumptive new system security controller $150_{NEW}$.

At 616, at least one of a system security controller rotation timer and/or a system security controller trust timer are initiated. The system security controller rotation timer causes the responsibilities of the system security controller to rotate among at least a portion of the peer devices 110 in the system 100 on a temporal basis that may be periodic, aperiodic, or intermittent.

At 618, if the system security controller rotation timer has expired-indicating a time-based rotation of the system security controller duties to another peer device included in the system 100, the method 600 continues at 620. If the system security controller trust timer has expired indicating the maximum temporal interval over which the current peer device 110A serving as the system security controller 150 may be trusted has expired, the method 600 continues at 622.

At 620, the duties of the system security controller 150 are rotated to a peer device 110 having the next highest IP address and the method returns to 604.

At 622, one of the peer devices 110 and/or the remote server 210 determines the whether the trusted status of the peer device 110A currently serving as the system security controller 150 has exceeded a defined temporal threshold (1 minute, 5 minutes, 30 minutes, 60 minutes, etc.). In some implementations, the trusted status may be determined by one or more peer devices 110 included in the system 100 using one or more trust assessment rulesets, one or more blacklists, one or more whitelists, data integrity.

At 624, at least one of the peer devices 110 included in the system 100 determines whether the peer device 110A currently serving as the system security controller 150 has maintained a satisfactory trust and/or trustworthiness rating. In some implementations, the peer device 110 that determines whether the peer device 110A currently serving as the system security controller 150 has maintained a satisfactory trust and/or trustworthiness rating may do using one or more trust assessment rulesets that include at least one defined rule used in determining the trust level of or trustworthiness in the peer device 110A.

If the level of trust and/or trustworthiness of the peer device 110A serving as the system security controller 150 is satisfactory, the peer device 110A is maintained as the system security controller 150, system security controller rotation timer is reset at 626, and the method returns to 618. If the level of trust and/or trustworthiness of the peer device 110A serving as the system security controller 150 is unsatisfactory, at 628 one or more lists (e.g., a "blacklist" or similar) is updated to indicate the peer device 110A currently serving as the system security controller 150 may no longer be considered "trusted" and another peer device 110 in the system 100 is selected to serve as the system security controller 150 at 604.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. The embodiments are not limited to this context.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to example 1, there is provided a round-robin peer device network security system. The system may include a plurality of networked processor-based peer devices, each of the peer devices including: at least one data storage device to store data representative of: at least one defined trust assessment ruleset; and at least one defined system security controller (SSC) peer device election ruleset. The system may additionally include at least one communication interface to communicate information to an SSC peer device elected from the network of peer devices. The system may additionally include at least one processor communicably coupled to the data storage device and to the at least one communications interface, the processor including: monitoring circuitry to collect information from at least one of the peer devices included in the plurality of networked peer devices; trust assessment circuitry to apply the at least one trust assessment ruleset to the information collected from the at least one peer device to determine a value indicative of a level of trust placed in the at least one peer device; and election circuitry to apply the at least one SSC peer device election ruleset to select at least one of the other peer devices included in the plurality of networked peer devices as a new SSC peer device to replace a current SSC peer device.

Example 2 may include elements of example 1 where the monitoring circuitry to collect information from at least one of the peer devices included in the plurality of networked peer devices may include monitoring circuitry to collect information from the current SSC peer device.

Example 3 may include elements of example 2 where the at least one communication interface may further communicate information to at least one other peer device included in the plurality of networked peer devices, the information including the determined value indicative of a level of trust placed in the current SSC peer device.

Example 4 may include elements of example 1 where the at least one processor may further include at least one timing circuit.

Example 5 may include elements of example 4 where the at least one timing circuit includes at least one trust timeout circuit that periodically causes the respective peer device to: cause the trust assessment circuitry to determine the value indicative of the level of trust placed in the current SSC peer device; and cause the communication interface to communicate determined value indicative of the level of trust placed in the current SSC peer device to at least some of the other plurality of networked peer devices.

Example 6 may include elements of example 4 where the at least one timing circuit includes at least one device rotation circuit that periodically causes the respective peer device to cause the election of the new SSC peer device from among the plurality of networked peer devices, the new SSC peer device to replace the current SSC peer device.

Example 7 may include elements of example 1 where the data representative of one or more defined trust assessment rulesets includes one or more of: an SSC peer device data integrity ruleset; an SSC peer device data age ruleset; an SSC peer device data relevancy ruleset; an SSC peer device timestamp ruleset; an SSC peer device geographic location ruleset; an SSC peer device virtual location; a whitelist of peer devices; or a blacklist of peer devices.

Example 8 may include elements of any of examples 1 through 7 where the at least one processor further includes authentication circuitry to provide authentication for at least some of the peer devices included in the plurality of peer devices.

Example 9 may include elements of any of examples 1 through 7 and may additionally include at least one authentication server to authenticate at least some of the peer devices included in the plurality of networked peer devices.

According to example 10, there is provided a peer device network system security method. The method may include, for each of at least some of a plurality of networked peer devices, selectively collecting, via monitoring circuitry, information indicative of a level of trust in a peer device in the plurality of networked peer devices, the peer device providing a current system security controller (SSC) peer device; applying, via trust assessment circuitry, at least one defined trust assessment ruleset to the information collected from the current SSC peer device; determining, by a processor communicably coupled to the monitoring circuitry and the trust assessment circuitry, a value indicative of a level of trust placed in the current SSC peer device; selecting, via election circuitry, at least one of the other peer devices included in the plurality of networked peer devices as a new SSC peer device using at least one SSC peer device election ruleset, the selection of the new SSC peer device responsive to the determined value indicative of the level of trust placed in the current SSC peer device meeting at least one defined threshold value.

Example 11 may include elements of example 10 where selectively collecting information indicative of a level of trust in the current SSC peer device may include selectively collecting from the current SSC peer device information indicative of at least one of: current SSC peer device data integrity; current SSC peer device data age; current SSC peer device data relevancy; current SSC peer device data timestamps; current SSC peer device geographic location; current SSC peer device virtual location; a whitelist of peer devices; or a blacklist of peer devices.

Example 12 may include elements of example 10 where selecting at least one of the other peer devices included in the plurality of networked peer devices as a new SSC peer device using at least one SSC peer device election ruleset may include determining an Internet Protocol (IP) address associated with at least some of the other peer devices included in the plurality of networked peer devices; nominating a peer device having the highest IP address as the new SSC peer device; authenticating the nominated new SSC peer device; and selecting the nominated new SSC peer device as the new SSC peer device responsive to a successful authentication of the nominated new SSC peer device.

Example 13 may include elements of example 12 and the method may additionally include, responsive to an unsuccessful authentication of the nominated new SSC peer device, performing at least one of: adding a unique identifier logically associated with the current SSC peer device to an untrusted peer device blacklist, or removing a unique identifier logically associated with the current SSC peer device from a trusted peer device whitelist; and nominating the peer device having the subsequent highest IP address as the new SSC peer device.

Example 14 may include elements of example 12 where selecting the nominated new SSC peer device as the new SSC peer device further may include transferring information indicative of at least one of: a threat assessment or a security risk from the current SSC peer device to the new SSC peer device.

Example 15 may include elements of example 14 where transferring information indicative of at least one of: a threat assessment or a security risk from the current SSC peer device to the new SSC peer device may further include applying, by the new SSC peer device, at least one trust assessment ruleset to the information received from the current SSC peer device to validate the information received from the current SSC peer device; and performing at least one of: adding a unique identifier logically associated with the current SSC peer device to an untrusted peer device blacklist, or removing a unique identifier logically associated with the current SSC peer device from a trusted peer device whitelist responsive to an unsuccessful validation of the information received from the current SSC peer device.

Example 16 may include elements of example 15 where transferring information indicative of at least one of: a threat assessment or a security risk from the current SSC peer device to the new SSC peer device may further include communicating the at least one of: an updated blacklist or an updated whitelist to at least some of the peer devices included in the plurality of networked peer devices.

Example 17 may include elements of example 10 where selecting at least one of the other peer devices included in the plurality of networked peer devices as a new SSC peer device using at least one SSC peer device election ruleset may further include: initiating at least one SSC peer device timer responsive to selection of a new SSC peer device; and responsive to an expiration of the at least one SSC peer device timer, nominating the peer device having the subsequent highest IP address as the new SSC peer device.

Example 18 may include elements of example 10 and the method may additionally include, responsive to the determined value indicative of a level of trust placed in the primary device failing to meet one or more defined threshold values, adding an identifier logically associated with the primary device to a stored data structure that includes a primary device blacklist.

Example 19 may include elements of any of examples 10 through 18 and the method may additionally include authenticating, via authentication circuitry communicably coupled to the processor, at least some of the peer devices included in the plurality of networked peer devices.

Example 20 may include elements of any of examples 10 through 18 and the method may additionally include authenticating, via a network connected authentication device, at least some of the peer devices included in the plurality of networked peer devices.

According to example 21, there is provided a system security controller (SSC) peer device for a plurality of networked peer devices. The system may include at least one data storage device to store data representative of at least one defined threat assessment ruleset; at least one communication interface to receive information from at one of the peer devices in the plurality of networked peer devices; at least one processor communicably coupled to the memory and to the at least one communications interface, the processor including: compilation circuitry to compile information received from the at least one peer device included in the plurality of networked peer devices, the information including at least one of: threat assessment information or security risk information; threat assessment circuitry to determine, based on the at least one defined threat assessment ruleset, a respective value indicative of at least one of: a threat assessment or a security risk to at least one peer device in the plurality of networked peer devices; and rollover circuitry to communicate at least a portion of the compiled information to a new SSC peer device responsive to an election of the new SSC peer device by at least one of the peer devices included in the plurality of networked peer devices.

Example 22 may include elements of example 21 where the processor may further include threat abatement circuitry to communicate to the at risk peer device one or more instructions to mitigate the defined security threat.

Example 23 may include elements of example 21 where the processor may further include transferred information assessment circuitry to assess veracity of peer device information received by the new SSC peer device from a former SSC peer device.

According to example 24, there is provided a network security system. The system may include, for each peer device in a plurality of networked peer devices: a means for selectively collecting information indicative of a level of trust in a peer device in the plurality of networked peer devices, the peer device providing a current system security controller (SSC) peer device; a means for applying at least one defined trust assessment ruleset to the information collected from the current SSC peer device; a means for determining a value indicative of a level of trust placed in the current SSC peer device; and a means for selecting at least one of the other peer devices included in the plurality of networked peer devices as a new SSC peer device using at least one SSC peer device election ruleset, the selection of the new SSC peer device responsive to the determined value indicative of the level of trust placed in the current SSC peer device meeting at least one defined threshold value.

Example 25 may include elements of example 24 where the means for selectively collecting information indicative of a level of trust a current SSC peer device may include selectively collecting from the current SSC peer device information indicative of at least one of: an SSC peer device data integrity ruleset; an SSC peer device data age ruleset; an SSC peer device data relevancy ruleset; an SSC peer device timestamp ruleset; an SSC peer device geographic location ruleset; an SSC peer device virtual location; a whitelist of peer devices; or a blacklist of peer devices.

Example 26 may include elements of example 24 where the means for selecting at least one of the other peer devices included in the plurality of networked peer devices as a new SSC peer device using at least one SSC peer device election ruleset may include a means for determining an Internet Protocol (IP) address associated with at least some of the other peer devices included in the plurality of networked peer devices; a means for nominating the peer device having the highest IP address as the new SSC peer device; a means for authenticating the nominated new SSC peer device; and a means for selecting the nominated new SSC peer device as the new SSC peer device responsive to a successful authentication of the nominated new SSC peer device.

Example 27 may include elements of example 24 and the system may additionally include a means for performing at least one of: adding a unique identifier logically associated with the current SSC peer device to an untrusted peer device blacklist, or removing a unique identifier logically associated with the current SSC peer device from a trusted peer device whitelist responsive to an unsuccessful authentication of the nominated new SSC peer device; and a means for nominating the peer device having the subsequent highest IP address as the new SSC peer device.

Example 28 may include elements of example 24 where the means for selecting at least one of the other peer devices included in the plurality of networked peer devices as a new SSC peer device using at least one SSC peer device election ruleset may further include a means for transferring information indicative of at least one of: a threat assessment or a security risk from the current SSC peer device to the selected new SSC peer device.

Example 29 may include elements of example 28 where the means for transferring information indicative of at least one of: a threat assessment or a security risk from the current SSC peer device to the selected new SSC peer device may further include a means for applying by the new SSC peer device at least one trust assessment ruleset to the information received from the current SSC peer device to validate the information received from the current SSC peer device; and a means for performing at least one of: adding a unique identifier logically associated with the current SSC peer device to an untrusted peer device blacklist, or removing a unique identifier logically associated with the current SSC peer device from a trusted peer device whitelist responsive to an unsuccessful validation of the information received from the current SSC peer device.

Example 30 may include elements of example 28 where the means for transferring information indicative of at least one of: a threat assessment or a security risk from the current SSC peer device to the selected new SSC peer device may further include a means for communicating the at least one of: an updated blacklist or an updated whitelist to at least some of the peer devices included in the plurality of networked peer devices.

Example 31 may include elements of example 24 where the means for selecting at least one of the other peer devices included in the plurality of networked peer devices as a new SSC peer device using at least one SSC peer device election ruleset may further include a means for initiating at least one SSC peer device timer responsive to selection of a new SSC peer device; and a means for nominating the peer device having the subsequent highest IP address as the new SSC peer device responsive to an expiration of the at least one SSC peer device timer.

Example 32 may include elements of any of examples 24 through 31 and the system may further include a means for authenticating at least some of the peer devices included in the plurality of networked peer devices.

Example 33 may include elements of any of examples 24 through 31 and the system may additionally include a means for authenticating at least some of the peer devices included in the plurality of networked peer devices.

According to example 34, there is provided a non-transitory computer readable storage device that includes machine-readable instructions that when executed by a processor, cause the processor to provide a network security system controller, that performs the following: selectively collects, via monitoring circuitry, information indicative of a level of trust in a peer device in the plurality of networked peer devices, the peer device providing a current system security controller (SSC) peer device; applies, via trust assessment circuitry, at least one defined trust assessment ruleset to the information collected from the current SSC peer device; determines, by a processor communicably coupled to the monitoring circuitry and the trust assessment circuitry, a value indicative of a level of trust placed in the current SSC peer device; and selects, via election circuitry, at least one of the other peer devices included in the plurality of networked peer devices as a new SSC peer device using at least one SSC peer device election ruleset, the selection of the new SSC peer device responsive to the determined value indicative of the level of trust placed in the current SSC peer device meeting at least one defined threshold value.

Example 35 may include elements of example 34 where the instructions that cause the processor to selectively collect information indicative of a level of trust in the current SSC peer device cause the processor to: selectively collect from the current SSC peer device information indicative of at least one of: current SSC peer device data integrity; current SSC peer device data age; current SSC peer device data relevancy; current SSC peer device data timestamps; current SSC peer device geographic location; current SSC peer device virtual location; a whitelist of peer devices; or a blacklist of peer devices.

Example 36 may include elements of example 34 where the instructions that cause the processor to select at least one of the other peer devices included in the plurality of networked peer devices as a new SSC peer device using at least one SSC peer device election ruleset cause the processor to: determine an Internet Protocol (IP) address associated with at least some of the other peer devices included in the plurality of networked peer devices; nominate a peer device having the highest IP address as the new SSC peer device; authenticate the nominated new SSC peer device; and select the nominated new SSC peer device as the new SSC peer device responsive to a successful authentication of the nominated new SSC peer device.

Example 37 may include elements of example 36 where the machine-readable instructions further cause the processor to: perform at least one of: add a unique identifier logically associated with the current SSC peer device to an untrusted peer device blacklist, or remove a unique identifier logically associated with the current SSC peer device from a trusted peer device whitelist responsive to an unsuccessful authentication of the nominated new SSC peer device; and nominate the peer device having the subsequent highest IP address as the new SSC peer device.

Example 38 may include elements of example 36 where the machine-readable instructions that cause the processor to select the nominated new SSC peer device as the new SSC peer device further cause the processor to: transfer information indicative of at least one of: a threat assessment or a security risk from the current SSC peer device to the new SSC peer device.

Example 39 may include elements of example 38 where the machine-readable instructions that cause the processor to transfer information indicative of at least one of: a threat assessment or a security risk from the current SSC peer device to the new SSC peer device further cause the processor to: apply, by the new SSC peer device, at least one trust assessment ruleset to the information received from the current SSC peer device to validate the information received from the current SSC peer device; and perform at least one of: add a unique identifier logically associated with the current SSC peer device to an untrusted peer device blacklist, or remove a unique identifier logically associated with the current SSC peer device from a trusted peer device whitelist responsive to an unsuccessful validation of the information received from the current SSC peer device.

Example 40 may include elements of example 39 where the machine-readable instructions that cause the processor to transferring information indicative of at least one of: a threat assessment or a security risk from the current SSC peer device to the new SSC peer device further cause the at least one processor to: communicate at least one of: an updated blacklist or an updated whitelist to at least some of the peer devices included in the plurality of networked peer devices.

Example 41 may include elements of example 39 where the machine-readable instructions that cause the processor to select at least one of the other peer devices included in the plurality of networked peer devices as a new SSC peer device using at least one SSC peer device election ruleset further cause the processor to: initiate at least one SSC peer device timer responsive to selection of a new SSC peer device; and nominate a peer device having the subsequent highest IP address as the new SSC peer device responsive to an expiration of the at least one SSC peer device timer.

Example 42 may include elements of example 34 where the machine-readable instructions further cause the processor to add an identifier logically associated with the primary device to a stored data structure that includes a primary device blacklist responsive to the determined value indicative of a level of trust placed in the primary device failing to meet one or more defined threshold values.

Example 43 may include elements of any of examples 34 through 42 where the machine-readable instructions further cause the processor to authenticate at least some of the peer devices included in the plurality of networked peer devices.

Example 44 may include elements of any of examples 34 through 42 where the machine-readable instructions further cause the processor to cause a network connected authentication device to authenticate least some of the peer devices included in the plurality of networked peer devices.

According to example 45, there is provided a system for providing a peer device round-robin network security, the system being arranged to perform the method of any of examples 10 through 20.

According to example 46, there is provided a chipset arranged to perform the method of any of examples 10 through 20.

According to example 47, there is provided a machine readable medium comprising a plurality of instructions that, in response to be being executed on a computing device, cause the computing device to carry out the method according to any of examples 10 through 20.

According to example 48, there is provided a device configured for providing a peer device round-robin network security, the device being arranged to perform the method of any of the examples 10 through 20.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:
1. A network security system, comprising:
a plurality of networked processor-based peer devices, each of the peer devices including:
at least one data storage device to store data representative of:
at least one defined trust assessment ruleset; and
at least one defined system security controller (SSC) peer device election ruleset;
at least one communication interface to communicate information to an SSC peer device elected from the network of peer devices;
at least one processor communicably coupled to the data storage device and to the at least one communications interface, the processor including:
monitoring circuitry to collect information from at least one of the peer devices included in the plurality of networked peer devices;
trust assessment circuitry to apply the at least one trust assessment ruleset to the information collected from the at least one peer device to determine a value indicative of a level of trust placed in the at least one peer device;
election circuitry to apply the at least one SSC peer device election ruleset to select at least one of the other peer devices included in the plurality of networked peer devices as a new SSC peer device to replace a current SSC peer device.

2. The system of claim 1 wherein the monitoring circuitry to collect information from at least one of the peer devices included in the plurality of networked peer devices comprises:
    monitoring circuitry to collect information from the current SSC peer device.

3. The system of claim 2 wherein the at least one communication interface to further:
    communicate information to at least one other peer device included in the plurality of networked peer devices, the information including the determined value indicative of a level of trust placed in the current SSC peer device.

4. The system of claim 1 wherein the at least one processor further includes at least one timing circuit.

5. The system of claim 4 wherein the at least one timing circuit includes at least one trust timeout circuit that periodically causes the respective peer device to:
    cause the trust assessment circuitry to determine the value indicative of the level of trust placed in the current SSC peer device; and
    cause the communication interface to communicate determined value indicative of the level of trust placed in the current SSC peer device to at least some of the other plurality of networked peer devices.

6. The system of claim 4 wherein the at least one timing circuit includes at least one device rotation circuit that periodically causes the respective peer device to:
    cause the election of the new SSC peer device from among the plurality of networked peer devices, the new SSC peer device to replace the current SSC peer device.

7. The system of claim 1 wherein the data representative of one or more defined trust assessment rulesets includes one or more of: an SSC peer device data integrity ruleset; an SSC peer device data age ruleset; an SSC peer device data relevancy ruleset; an SSC peer device timestamp ruleset; an SSC peer device geographic location ruleset; an SSC peer device virtual location; a whitelist of peer devices; or a blacklist of peer devices.

8. The system of claim 1 wherein the at least one processor further includes authentication circuitry to provide authentication for at least some of the peer devices included in the plurality of peer devices.

9. The system of claim 1, further comprising at least one authentication server to authenticate at least some of the peer devices included in the plurality of networked peer devices.

10. A network security method, comprising:
    for each of at least some of a plurality of networked peer devices:
        selectively collecting, via monitoring circuitry, information indicative of a level of trust in a peer device in the plurality of networked peer devices, the peer device providing a current system security controller (SSC) peer device;
        applying, via trust assessment circuitry, at least one defined trust assessment ruleset to the information collected from the current SSC peer device;
        determining, by a processor communicably coupled to the monitoring circuitry and the trust assessment circuitry, a value indicative of a level of trust placed in the current SSC peer device;
        selecting, via election circuitry, at least one of the other peer devices included in the plurality of networked peer devices as a new SSC peer device using at least one SSC peer device election ruleset, the selection of the new SSC peer device responsive to the determined value indicative of the level of trust placed in the current SSC peer device meeting at least one defined threshold value.

11. The method of claim 10, wherein selectively collecting information indicative of a level of trust in the current SSC peer device comprises:
    selectively collecting from the current SSC peer device information indicative of at least one of: current SSC peer device data integrity; current SSC peer device data age; current SSC peer device data relevancy; current SSC peer device data timestamps; current SSC peer device geographic location; current SSC peer device virtual location; a whitelist of peer devices; or a blacklist of peer devices.

12. The method of claim 10 wherein selecting at least one of the other peer devices included in the plurality of networked peer devices as a new SSC peer device using at least one SSC peer device election ruleset comprises:
    determining an Internet Protocol (IP) address associated with at least some of the other peer devices included in the plurality of networked peer devices;
    nominating a peer device having the highest IP address as the new SSC peer device;
    authenticating the nominated new SSC peer device; and
    selecting the nominated new SSC peer device as the new SSC peer device responsive to a successful authentication of the nominated new SSC peer device.

13. The method of claim 12, further comprising:
    responsive to an unsuccessful authentication of the nominated new SSC peer device, performing at least one of:
        adding a unique identifier logically associated with the current SSC peer device to an untrusted peer device blacklist, or removing a unique identifier logically associated with the current SSC peer device from a trusted peer device whitelist; and
    nominating the peer device having the subsequent highest IP address as the new SSC peer device.

14. The method of claim 12 wherein selecting the nominated new SSC peer device as the new SSC peer device further comprises:
    transferring information indicative of at least one of: a threat assessment or a security risk from the current SSC peer device to the new SSC peer device.

15. The method of claim 14 wherein transferring information indicative of at least one of: a threat assessment or a security risk from the current SSC peer device to the new SSC peer device further comprises:
    applying, by the new SSC peer device, at least one trust assessment ruleset to the information received from the current SSC peer device to validate the information received from the current SSC peer device; and
    performing at least one of: adding a unique identifier logically associated with the current SSC peer device to an untrusted peer device blacklist, or removing a unique identifier logically associated with the current SSC peer device from a trusted peer device whitelist responsive to an unsuccessful validation of the information received from the current SSC peer device.

16. The method of claim 15, wherein transferring information indicative of at least one of: a threat assessment or a security risk from the current SSC peer device to the new SSC peer device further comprises:
    communicating the at least one of: an updated blacklist or an updated whitelist to at least some of the peer devices included in the plurality of networked peer devices.

17. The method of claim 10 wherein selecting at least one of the other peer devices included in the plurality of networked peer devices as a new SSC peer device using at least one SSC peer device election ruleset further comprises:
- initiating at least one SSC peer device timer responsive to selection of a new SSC peer device; and
- responsive to an expiration of the at least one SSC peer device timer, nominating the peer device having the subsequent highest IP address as the new SSC peer device.

18. The method of claim 10, further comprising:
responsive to the determined value indicative of a level of trust placed in the primary device failing to meet one or more defined threshold values, adding an identifier logically associated with the primary device to a stored data structure that includes a primary device blacklist.

19. The method of claim 10, further comprising:
authenticating, via authentication circuitry communicably coupled to the processor, at least some of the peer devices included in the plurality of networked peer devices.

20. The method of claim 10, further comprising:
authenticating, via a network connected authentication device, at least some of the peer devices included in the plurality of networked peer devices.

21. A non-transitory computer readable storage device that includes machine-readable instructions that when executed by a processor, cause the processor to provide a network security system controller, that performs the following:
- selectively collects, via monitoring circuitry, information indicative of a level of trust in a peer device in the plurality of networked peer devices, the peer device providing a current system security controller (SSC) peer device;
- applies, via trust assessment circuitry, at least one defined trust assessment ruleset to the information collected from the current SSC peer device;
- determines, by a processor communicably coupled to the monitoring circuitry and the trust assessment circuitry, a value indicative of a level of trust placed in the current SSC peer device;
- selects, via election circuitry, at least one of the other peer devices included in the plurality of networked peer devices as a new SSC peer device using at least one SSC peer device election ruleset, the selection of the new SSC peer device responsive to the determined value indicative of the level of trust placed in the current SSC peer device meeting at least one defined threshold value.

22. The non-transitory computer readable medium of claim 21 wherein the instructions that cause the processor to selectively collect information indicative of a level of trust in the current SSC peer device cause the processor to:
- selectively collect from the current SSC peer device information indicative of at least one of: current SSC peer device data integrity; current SSC peer device data age; current SSC peer device data relevancy; current SSC peer device data timestamps; current SSC peer device geographic location; current SSC peer device virtual location; a whitelist of peer devices; or a blacklist of peer devices.

* * * * *